United States Patent [19]

Dean

[11] Patent Number: 4,485,215

[45] Date of Patent: Nov. 27, 1984

[54] MOLDING COMPOSITION

[75] Inventor: Barry D. Dean, Springfield, Pa.

[73] Assignee: Atlantic Richfield Company, Los Angeles, Calif.

[21] Appl. No.: 493,458

[22] Filed: May 11, 1983

[51] Int. Cl.³ ............................................ C08L 35/02
[52] U.S. Cl. .................................... 525/205; 525/193; 525/210; 525/213; 525/282; 525/289; 525/292; 525/302; 525/324
[58] Field of Search ............... 525/193, 210, 205, 213, 525/282, 289, 292, 302, 324

[56] References Cited

U.S. PATENT DOCUMENTS 4,211,692 7/1980 Barkis et al. .................. 525/210

FOREIGN PATENT DOCUMENTS 1079893 6/1980 Canada .

*Primary Examiner*—Jacob Ziegler
*Attorney, Agent, or Firm*—Dennis M. Kozak

[57] ABSTRACT

Interpolymers resulting from the polymerization of a vinyl/aromatic monomer such as styrene, an olefinic nitrile such as acrylonitrile and a maleimide in the presence of both an ethylene propylene-diene terpolymer (EPDM) and an ethylene-acrylate copolymer and to molded products produced therefrom are described.

16 Claims, No Drawings

MOLDING COMPOSITION

This invention relates to improved molding compositions.

More specifically, this invention relates to interpolymers resulting from the polymerization of a vinyl-/aromatic monomer such as styrene, an olefinic nitrile such as acrylonitrile and a maleimide in the presence of both an ethylene-propylene-diene terpolymer (EDPM) and an ethylene based thermoplastic elastomer containing an acrylate functionality and to molded products produced therefrom.

The use of EPDM rubbers for impact modification has been demonstrated for polystyrene in blends with polyphenylene oxide as described in U.S. Pat. Nos. 3,658,945; 3,943,191 and 4,152,316. Moreover, the use of EPDM rubbers to impact modify styrene/maleimide/acrylonitrile terpolymers is taught in Canadian Pat. No. 1,079,893. It is also well known to employ EPDM to impact modify styrene/acrylonitrile copolymers. See for example U.S. Pat. Nos. 3,489,822; 4,166,881 and 4,202,948.

The present invention provides a novel thermoplastic molding composition which utilizes an ethylene based thermoplastic elastomer containing an acrylate functionality in combination with an EPDM rubber to improve at least one property of the molded thermoplastic composition. The incorporation of the ethylene based thermoplastic elastomer containing an acrylate functionality has, quite surprisingly, been found to significantly improve the impact strength of the molded composition through a proportionate degree of miscibility between the matrix resin and the acrylate functionality on the ethylene based thermoplastic elastomer.

According to this invention, there is provided a thermoplastic molding composition comprising: (a) a matrix resin comprised of a monoalkenyl aromatic monomer, a dicarboxylic anhydride imide and a monoalkenyl nitrile monomer; (b) an EPDM rubber; and (c) an ethylene based thermoplastic elastomer containing an acrylate functionality wherein the molding composition is produced by polymerizing the matrix resin (a) in the presence of (b) and (c).

Also, according to this invention there is provided a method for producing a moldable compound which comprises incorporating an EPDM rubber and an ethylene based thermoplastic elastomer containing an acrylate functionality into a matrix resin composition comprised of a monoalkenyl aromatic monomer, a dicarboxylix anhydride imide and a monoalkenyl nitrile monomer; and, polymerizing the resulting composition, the ethylene based thermoplastic elastomer being present in an amount sufficient to improve at least one property of the molded composition.

In its preferred embodiment the thermoplastic molding composition of this invention will comprise in weight percent (a) from about 65 to about 95 of a matrix resin comprised of from about 40 to about 75 of a monoalkenyl aromatic monomer, from about 20 to about 35 of a dicarboxylic anhydride imide and from about 5 to about 25 of a monoalkenyl nitrile monomer; (b) from about 3 to about 25 EPDM rubber; and (c) from about 2 to about 10 ethylene based thermoplastic elastomer containing an acrylate functionality.

Any suitable monoalkenyl aromatic monomer can be employed to produce the matrix resin. Suitable monoalkenyl aromatic monomers include styrene, alpha-methylstyrene, para-methylstyrene, t-butylstyrene or any mono-, di-, or trihalogenated styrene, and the like, and their mixtures.

Any suitable dicarboxylic anhydride imide can be employed to produce the matrix resin. Suitable dicarboxylic anhydride imides include maleimide, N-methylmaleimide, N-ethylmaleimide, N-phenylmaleimide or any N-(mono-, di-, or trihalogenated)phenylmaleimide, and the like, and their mixtures.

Any suitable monoalkenyl nitrile monomer can be employed to produce the matrix resin. Suitable monoalkenyl nitrile monomers include acrylonitrile, methacrylonitrile, and their mixtures. The monoalkenyl nitrile monomer employed in the matrix resin is preferably acrylonitrile.

The ethylene based thermoplastic elastomer will comprise from about 99 to about 75 weight percent ethylene and from about 1 to about 25 weight percent of a monoalkenyl acrylate. The monoalkenyl acrylate can be selected from methyl acrylate, ethyl acrylate, n-butyl acrylate, and the like, and their mixtures. The most preferred monoalkenyl acrylate is ethyl acrylate.

The EPDM rubber is comprised of ethylene, propylene and a nonconjugated diene such as 1,4-hexadiene, dicyclopentadiene or most preferably, ethylidene norbornene.

The molecular weight of the matrix resin should be between about 100,000 to about 700,000; most preferably about 200,000 to about 500,000. The EPDM rubber should possess a molecular weight of about 100,000 to about 500,000; most preferably about 200,000 to about 400,000.

The thermoplastic molding composition of this invention is most conveniently prepared in a solvent or solvent mixture. Useful solvents are benzene, toluene, chlorobenzene, xylene, hexane, heptane and the like, and their mixtures. Particularly suitable for use is a solvent mixture comprised of 40 to 60 weight percent of chlorobenzene and 60 to 40 weight percent of heptane. The EPDM rubber and ethylene based thermoplastic elastomer are dissolved in the solvent mixture typically at ambient temperature. The polymerization of matrix resin monomers in the presence of the EPDM rubber and the ethylene based thermoplastic elastomer is conducted at a temperature within the range of from about 60° C. to about 120° C., most preferably between 70° C. and 90° C. The free radical initiators which are useful are benzoyl peroxide, t-butyl perpivalate, t-butyl peracetate, t-butyl peroctoate and t-butyl perbenzoate. Benzoyl peroxide is the preferred initiator.

Prior to any type of thermal processing, the polymer is stabilized. Any of the commercially available antioxidants are acceptable, however, most preferred is an equal weight percent mixture of N,N-diphenylp-phenylene diamine and tris(mono- and dinonyl)phenyl phosphite totaling between about 1 to about 2 weight percent.

Evaluation of material properties was performed based on the following ASTM standard tests: flexural strength and modulus (D-790), tensile strength (D-638), notched Izod (D-256) and DTUL (deflection temperature under load, D-648). Gardner Falling Weight Index was established using a ½" diameter eight-pound weight and a 1¼" diameter orifice. Glass transition temperature was evaluated by differential scanning calorimetry. Melt Flow parameters were established via melt indexing.

The invention is demonstrated by the following examples.

EXAMPLE 1

This example demonstrates the preparation of a molding composition of this invention.

A 4-liter reactor was charged with a solvent mixture of 300 g of monochlorobenzene and 300 g of heptane. About 39 g of EPDM Rubber (Polysar®585; 10% ethylidene norbornene, Mooney viscosity ML 1+4 212° F.) and 6 g of ethylene-ethyl acrylate (18% ethyl acrylate) were dissolved in the solvent mixture at ambient temperature. The internal temperature of the reactor was raised to 75° C. A solution of 94 g of styrene, 60 g N-phenylmaleimide and 20 g acrylonitrile containing 1.5 g of benzoyl peroxide was added to the reactor. The stirring rate was 60 rpm. After two hours, the reactor was brought to 80° C. and a second portion of initiator, 1.0 g benzoyl peroxide was added. Four hours from the start of the reaction, 300 g of a 50:50 co-solvent mixture (chlorobenzene:heptane) were added. Total reaction time was seven hours, and was followed by devolatilization at 170° C. under vacuum. The reaction product was recovered, converted into grinds and extruded at 270° C. Samples for testing were prepared by injection molding at 280° C. Prior to processing, the grinds were stabilized with 1 weight percent of a 50:50 mixture of N,N-diphenyl-p-phenylene diamine and tris(mono- and dinonyl) phenyl phosphite. The molding composition and its properties are outlined in Table I.

TABLE I

| | |
|---|---|
| % Conversion, Overall | 90 |
| % Conversion, Matrix | 87 |
| Matrix Composition | |
| Styrene (wt. %) | 52 |
| N—Phenylmaleimide (wt. %) | 37 |
| Acrylonitrile (wt. %) | 11 |
| Overall Rubber Composition (wt. %) | |
| EPDM (Polysar ® 585) | 19 |
| Ethylene-Ethyl Acrylate | 3 |
| Physical Properties: | |
| Tensile Strength (psi) | 6,900 |
| Flexural Strength (psi) | 12,800 |
| Flexural Modulus (psi) | 330,000 |
| DTUL (°F.) | |
| ⅛″, unannealed | 275 |
| ⅛″, annealed | 305 |
| Notched Izod (⅛″, ft-lbs/in) | 3.5 |
| Gardner Falling Weight Index (in-lbs) | 180 |
| Elongation (%) | 10 |
| Melt Index (grams/10 minutes, 275° C.) | 15 |

The molding composition of Example I was further tested and found to exhibit good thermal stability in an oxygen atmosphere. The composition exhibited a 1% and a 5% weight loss in an oxygen atmosphere at 302° C. and 347° C., respectively.

EXAMPLE 2

This example serves to demonstrate the miscibility between the styrene/N-phenyl maleimide/acrylonitrile resin (S/N-PMI/AN) matrix and the acrylate functionality in the ethylene based thermolastic elastomer.

| Composition Number | | Tg(°C., DSC) |
|---|---|---|
| 1 | 100% S/N—PMI/AN—EPDM | 181 |
| 2 | 95% S/N—PMI/AN—APDM + 5% Ethylene-Ethyl Acrylate | 177 |
| 3 | 85% S/N—PMI/AN—EPDM + 15% Ethylene-Ethyl Acrylate | 170 |
| 4 | 75% S/N—PMI/AN—EPDM + 25% Ethylene-Ethyl Acrylate | 162 |

The S/N-PMI/AN-EPDM tested in Compositions Nos. 1–4 was prepared using substantially the procedure of Example 1 and employing the same ingredients and amounts except that the 6 g of ethylene-ethyl acrylate were replaced with an additional 6 g of EPDM. For the purpose of glass transition determination composition Nos. 2, 3 and 4 were prepared by melt blending the specified amounts of S/N-PMI/AN-EPDM and ethylene-ethyl acrylate.

The ethylene-ethyl acrylate comprised 18% ethyl acrylate and 82% ethylene. The glass transition reported refers to the S/N-PMI/AN resin matrix only.

EXAMPLE 3

This example serves to demonstrate the flexibility of the matrix composition to include a halogenated monoalkenyl aromatic monomer for the purpose of flame retardancy.

The process, as outlined in Example 1, was followed identically except that the monoalkenyl aromatic monomer feed to the reactor comprised 83 g styrene and 11 g of dibromostyrene. Table II defines the matrix composition and resin properties for a fire retardant resin in which 12.2 g of antimony oxide ($Sb_2O_3$) was melt compounded with 203 g of resin prior to molding test specimens.

TABLE II

| | |
|---|---|
| Matrix Resin Composition: | |
| Styrene (Wt. %) | 43 |
| Dibromostyrene (Wt. %) | 12 |
| N—Phenylmaleimide (Wt. %) | 36 |
| Acrylonitrile (Wt. %) | 9 |
| Overall Rubber Composition (wt. %) | |
| EPDM (Polysar ® 585) | 19 |
| Ethylene-Ethyl Acrylate | 3 |
| Properties | |
| Tensile Strength (psi) | 6,200 |
| Notched Izod (⅛″, ft-lbs/in) | 2.5 |
| Gardner Falling Weight Index (in-lbs) | 140 |
| Flammability UL-94 V-O (⅛″ thickness) | |

EXAMPLE 4

This example serves to demonstrate the improvement obtained by the utilization of the dual rubber (EPDM-ethylene based thermoplastic elastomer) system of this invention as compared to the employment of EPDM rubber alone.

Example 1 was followed identically except the 6 g of ethylene-ethyl acrylate were replaced with an additional 6 g of EPDM (Polysar®585). The overall weight % of rubber-ethylene thermoplastic elastomer in the matrix resin described in Example 1 was 22%; the overall weight percent of rubber in the resin obtained in this example was 22%. Properties for the all EPDM containing resin (not according to this Invention) are outlined in Table III and compared with the properties for the dual rubber containing composition of this invention, prepared in Example I.

TABLE III

| Properties | Example 4 | Example 1 (Invention) |
|---|---|---|
| Tensile Strength (psi) | 6,700 | 6,900 |
| Flexural Strength (psi) | 12,300 | 12,800 |
| Flexural Modulus (psi) | 300,000 | 330,000 |
| DTUL (°F.) ⅛" unannealed | 274 | 275 |
| Notched Izod (⅛" ft-lbs/in) | 2.1 | 3.5 |
| Gardner Falling Weight Index (in-lbs) | 90 | 180 |
| Elongation (%) | 4 | 10 |
| Melt Index (grams/10 minutes, 275° C.) | 11.3 | 15 |

The above data serve to illustrate that the molded compositions of this invention containing a dual rubber combination of an EPDM rubber and ethylene based thermoplastic elastomer exhibit at least one improved property as compared to a similar composition comprising only EPDM rubber. The molded composition of this invention, for example, exhibited a 66% improvement in the notched Izod test and a 100% improvement in the Gardner Falling Weight Index test. Elongation and Melt Index property valves also showed noticeable improvement.

It is evident from the foregoing that various modifications can be made to this invention. Such, however, are considered as being within the scope of this invention.

What is claimed is:

1. A thermoplastic molding composition comprising (a) a matrix resin comprised of a monoalkenyl aromatic monomer, a dicarboxylic anhydride imide monomer and a monoalkenyl nitrile monomer; (b) an ethylene-propylene-diene terpolymer rubber; and (c) an ethylene based thermoplastic elastomer containing an acrylate functionality wherein the molding composition is produced by polymerizing in a temperature range of about 60° C. to about 120° C. the polymerizing the monomers of which the matric resin is comprised matrix resin (a) in the presence of the (b) and the (c).

2. The thermoplastic molding composition of claim 1 in which said monoalkenyl aromatic monomer is selected from the group consisting of styrene, alphamethylstyrene, para-methylstyrene, t-butylstyrene, and mono-, di-, or trihalogenated styrene.

3. The thermoplastic molding composition of claim 1 in which said dicarboxylic anhydride imide is selected from the group consisting of maleimide, N-methylmaleimide, N-ethylmaleimide, N-phenylmaleimide, and N-(mono-, di-, or trihalogenated) phenylmaleimide.

4. The thermoplastic molding composition of claim 1 in which said monoalkenyl nitrile monomer is selected from the group consisting of acrylonitrile and methacrylonitrile.

5. The thermoplastic molding composition of claim 1 in which said (b) terpolymer is comprised of ethylene, propylene and a nonconjugated diene.

6. The thermoplastic molding composition of claim 5 in which said nonconjugated diene is selected from the group consisting of 1,4-hexadiene, dicyclopentadiene and ethylidiene norbornene.

7. The thermoplastic molding composition of claim 1 in which said ethylene based thermoplastic elastomer comprises from about 99 to about 75 weight percent ethylene and from about 1 to about 25 weight percent of a monoalkenyl acrylate.

8. The thermoplastic molding composition of claim 7 in which said monoalkenyl acrylate is selected from the group consisting of methyl acrylate, ethyl acrylate, and n-butyl acrylate.

9. The thermoplastic molding composition of claim 1 comprising in weight percent from about 65 to about 95 of the matrix resin, from about 3 to about 25 of the (b) terpolymer and from about 2 to about 10 of the ethylene based thermoplastic elastomer containing an acrylate functionality.

10. The thermoplastic molding composition of claim 9 in which said matrix resin is comprised of in weight percent from about 40 to about 65 monoalkenyl aromatic monomer, from about 20 to about 35 dicarboxylic anhydride imide, and from about 5 to about 25 monoalkenyl nitrile monomer.

11. The thermoplastic molding composition of claim 1 in which said matrix resin has a molecular weight within the range of from about 100,000 to about 700,000.

12. The thermoplastic molding composition of claim 1 in which said matrix resin has a molecular weight within the range of from about 200,000 to about 500,000.

13. The thermoplastic molding composition of claim 1 in which said (b) terpolymer has a molecular weight within the range of from about 100,000 to about 500,000.

14. The thermoplastic molding composition of claim 1 in which said (b) terpolymer has a molecular weight within the range of from about 200,000 to about 400,000.

15. A method for producing a moldable compound which comprises incorporating 1 an ethylene-propylene-diene terpolymer rubber and 2 an ethylene based thermoplastic elastomer containing an acrylate functionality into (3) a matrix resin comprised of a monoalkenyl aromatic monomer, a dicarboxylic anhydride imide monomer and a monoalkenyl nitrile monomer, and polymerizing in a temperature range of about 60° to about 120° C. the resulting composition is produced by polymerizing the monomers of which the matric resin is comprised the matrix resin (3) in the presence of the I and the II., the ethylene based thermoplastic elastomer being present in an amount sufficient to improve at least one property of the molded composition.

16. A molded article produced by molding the thermoplastic molding composition of claim 1.

* * * * *

UNITED STATES PATENT AND TRADEMARK OFFICE
CERTIFICATE OF CORRECTION

PATENT NO. : 4,485,215

DATED : November 27, 1984

INVENTOR(S) : Barry D. Dean

It is certified that error appears in the above-identified patent and that said Letters Patent is hereby corrected as shown below:

In claim 1, col. 5, line 44, after "120°C", delete the phrase "the polymerizing"

In claim 1, col. 5, line 45, delete "matric" and insert --matrix--

In claim 1, col. 5, line 45, after the word "resin" (first occurrence) insert --(a)--

In claim 1, col. 5, line 45, after the word "comprised" delete "matrix resin (a)"

In claim 15, col. 6, line 46, delete "1" and insert --(1)--

In claim 15, col. 6, line 47, delete "2" and insert --(2)--

In claim 15, col. 6, line 53-54, delete the phrase "the resulting composition is produced by polymerizing"

In claim 15, col. 6, line 54, delete "matric resin" and insert --matrix resin (3)--

UNITED STATES PATENT AND TRADEMARK OFFICE
CERTIFICATE OF CORRECTION

PATENT NO. : 4,485,215   Page 2 of 2
DATED : November 27, 1984
INVENTOR(S) : Barry D. Dean It is certified that error appears in the above-identified patent and that said Letters Patent is hereby corrected as shown below:

In claim 15, col. 6, line 55, delete "the matrix resin (3)"

In claim 15, col. 6, line 55, delete "I" and insert --(1)--

In claim 15, col. 6, line 56, delete "II" and insert --(2)--

Signed and Sealed this

Twenty-fourth Day of September 1985

[SEAL]

Attest:

DONALD J. QUIGG

Attesting Officer

Commissioner of Patents and
Trademarks—Designate